United States Patent [19]

Liu

[11] Patent Number: 4,588,754

[45] Date of Patent: May 13, 1986

[54] LOW MODULUS STRUCTURAL FOAM

[75] Inventor: Nan-I Liu, Mt. Vernon, Ind.

[73] Assignee: General Electric Company, Pittsfield, Mass.

[21] Appl. No.: 783,974

[22] Filed: Oct. 3, 1985

Related U.S. Application Data

[63] Continuation of Ser. No. 567,987, Jan. 4, 1984.

[51] Int. Cl.$^4$ ............................................. C08J 9/08
[52] U.S. Cl. ........................................... 521/92; 521/97; 521/125; 521/130; 521/138; 521/139; 521/143; 521/146; 521/150; 521/180; 521/182
[58] Field of Search ............... 521/182, 97, 183, 184, 521/189, 138, 92

[56] References Cited

U.S. PATENT DOCUMENTS

| | | | |
|---|---|---|---|
| 3,211,678 | 10/1965 | Robinson | 521/182 |
| 3,600,336 | 8/1971 | Okada et al. | 521/183 |
| 4,164,611 | 8/1979 | Schmidt et al. | 521/189 |
| 4,183,822 | 1/1980 | Collington et al. | 521/183 |
| 4,224,264 | 9/1980 | Ort | 521/182 |
| 4,263,165 | 4/1981 | Roos et al. | 521/182 |
| 4,263,409 | 4/1981 | Fiberti | 521/81 |
| 4,278,769 | 7/1981 | Gebauer et al. | 521/182 |
| 4,280,005 | 7/1981 | Fox | 521/182 |
| 4,288,561 | 9/1981 | Craft et al. | 521/182 |
| 4,312,960 | 1/1982 | Ort et al. | 521/182 |
| 4,331,776 | 5/1982 | Gazonnet | 521/182 |
| 4,406,846 | 9/1983 | Paschke et al. | 521/182 |

FOREIGN PATENT DOCUMENTS

| | | |
|---|---|---|
| 0058767 | 5/1977 | Japan . |
| 0169050 | 12/1981 | Japan . |

OTHER PUBLICATIONS

"Hydrocerol, Hydrocerol Compound, Hydrocerol-CLM70" Product Literature-Boehringer Ingelheim.

"Production of Foamed Thermoplastics with Hydrocerol-Compound and Hydrocerol Batches" Product Literature Boehringer Ingelheim.

"Technology of Celogen Blowing Agents" Product Literature Uniroyal Chemical Division of Uniroyal Inc.

*Primary Examiner*—Morton Foelak
*Attorney, Agent, or Firm*—Edward K. Welch, II; William F. Mufatti; John W. Harbour

[57] ABSTRACT

Foamable low-modulus thermoplastic compositions are prepared by incorporating suitable chemical blowing agents in low-modulus polymers. Specifically, low-modulus copolyetherester compositions may be foamed by use of citric acid, sodium bicarbonate or mixtures thereof as blowing agents.

15 Claims, No Drawings

LOW MODULUS STRUCTURAL FOAM

This is a continuation of application Ser. No. 567,987 filed Jan. 4, 1984.

The present invention relates to low modulus thermoplastic foams. More specifically, low modulus structural engineering thermoplastic foams may be prepared from low modulus thermoplastic compositions, particularly copolyetheresters, and blends thereof with other thermoplastic polymers, by using suitable blowing agents.

BACKGROUND

Plastic foams are well known and are typified as being 2-phase gas-solid systems in which the solid is continuous and composed of a synthetic polymer. The gas phase is usually distributed in voids or pockets called cells which may be interconnected in such a manner that the gas can pass from one cell to another or are discrete such that the gas phase of each cell is independent of that of the other cells. Generally, foamed plastics are achieved by dispersing an inert gas through the polymer melt either by direct introduction into the melt or by pre-blending with a chemical blowing agent that decomposes with heat. Exemplary of some of the plastics which have been foamed include polystyrenes, polyolefins, polycarbonates, polyurethanes, polyesters, and aldehyde based condensation resins and the like, U.S. Pat. Nos. 2,959,508; 3,717,559; 3,704,269; 3,753,933; 3,863,000; 4,097,425; 4,002,581; 4,226,949; 4,247,652 and 4,312,960, generally. A preferred class of plastic foams are those known as structural foams. In general, structural foam plastics can be defined as products made from virtually any high-molecular-weight thermoplastic organic polymer having a cellular core with an integral skin on all sides. The skin is relatively non-porous in relation to the cellular core. They tend to have a high strength-to-weight ratio and a density of greater than about 0.3 grams per cubic centimeter.

While most organic polymers have been foamed, others have not been successfully foamed due to the lack of or inability to find suitable blowing agents. This is especially true for low modulus thermoplastics, particularly copolyetherester resins and blends thereof with other high-molecular weight thermoplastic polymers. Recent attempts to foam low modulus thermoplastics have resulted in parts manifesting very irregular, non-uniform internal cellular structures. Their surface is characterized by sink marks and rough surface texture as a result of the collapse of the cells. Further, they suffer from very uneven external skin, wherein certain portions are disproportionately thicker or thinner than others. Finally, without the aid of nucleating agents, these compositions have very little cellular development at all and what cellular development there is, is very non-uniform.

Therefore, it is an object of the present invention to identify suitable blowing agents for copolyetheresters wherein said blowing agents generate gas as a consequence of their physical change or decomposition at a temperature at or near the processing temperature of the polymer to be foamed and said gases and/or other decomposition products do not deleteriously affect the polymer resin.

It is also an object of the present invention to prepare low modulus engineering thermoplastic structural foams wherein the low modulus thermoplastic polymer is especially copolyetheresters or blends thereof with other high-molecular weight thermoplastics.

SUMMARY

It has now been found that certain chemical blowing agents may be used to produce low modulus engineering thermoplastic structural foam.

Specifically, chemical blowing agents including azodicarbonamide, modified azodicarbonamides, p-toluene sulfonyl semicarbazide, citric acid, sodium bicarbonate, citric acid/sodium bicarbonate concentrate and aliphatic azoesters may be used as blowing agents to produce foamed versions of low modulus thermoplastic compositions. Such low modulus thermoplastic resins are typified as having a flexual modulus of less than about 50,000 psi, less than about 130,000 when said resin consists of a blend of a low modulus thermoplastic and a high-molecular weight thermoplastic and less than 400,000 when such low modulus resins are modified with fillers including reinforcing fillers.

In its preferred embodiments, the present invention discloses foamed low modulus copolyetheresters wherein the foamed articles produced have a very uniform cellular structure, good surface appearance and high falling weight impact strength. Such polymers are foamed by the use of the above-mentioned foaming agents, most preferably citric acid, sodium bicarbonate and citric acid/sodium bicarbonate concentrate compositions. The low modulus copolyetherester polymers consist essentially of a multiplicity of recurring intralinear long-chain and short-chain ester units connected head-to-tail through ester linkages, said long-chain ester units being represented by the following structure:

(a)

and said short-chain ester units being represented by the following structure:

(b)

wherein G is a divalent radical remaining after removal of terminal hydroxyl groups from poly(alkylene oxide) glycols having a carbon-to-oxygen ratio of about 2.0–4.3 and molecular weight between about 400 to 6000; R is a divalent radical remaining after removal of carboxyl groups from one or more dicarboxylic acids having a molecular weight less than about 300; and D is a divalent radical remaining after removal of hydroxyl groups from one or more saturated or unsaturated, low molecular weight diols having a molecular weight less than about 250, with the provisions that the short-chain ester units constitute about 15–95% by weight, preferably 25–90% by weight, of the copolyetherester and, ergo, the long-chain ester units constitute about 5 to 85% by weight, preferably 10–75% by weight of the copolyetherester.

The copolyetherester composition may also consist of blends of copolyetherester polymer with other high-molecular weight thermoplastics, including for example polyesters, polycarbonates, polyolefins, styrene resins, and copolymers thereof, among others. The copolyetherester polymer or blends may further contain suitable fillers and or reinforcing agents, as well as impact modifier and flame retardants.

DETAILED DESCRIPTION

The low modulus thermoplastic polymers which are within the scope of the present invention include copolyetherester polymers, polyamides, polyolefins and the like. These low-modulus thermoplastic polymers are characterized as having a flexual modulus of less than about 50,000 psi, preferably less than about 30,000 psi as determined by ASTM-D790. Low modulus thermoplastic compositions having incorporated therein other high molecular weight thermoplastic polymers and/or reinforcing agents or fillers will have higher flexual modulus as will be described below.

The present invention is most particularly directed to low-modulus copolyetheresters. Copolyetheresters are widely available commercially and are described in U.S. Pat. Nos. 3,023,192; 3,651,014; 3,763,109; 3,766,146; 3,784,520; 3,801,547; 4,156,774; 4,264,761 and 4,355,155, among others. In general, as noted above, copolyetherester polymers consist essentially of a multiplicity of recurring intralinear long-chain and short-chain ester units.

The term "long-chain ester units" as applied to units in the copolyetherester polymer chain refers to the reaction product of long-chain glycols with dicarboxylic acids. Such "long-chain ester units", correspond to formula (a) above. The long-chain glycols are polymeric glycols having terminal (or as nearly terminal as possible) hydroxy groups and a molecular weight of from about 400–6000. The long-chain glycols used to prepare the copolyetheresters of this invention are poly(alkylene oxide) glycols having a carbon-to-oxygen ratio of about 2.0–4.3.

Representative long-chain glycols are poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen mole ratio in the glycol does not exceed about 4.3).

The term "short-chain ester units" as applied to units in the polymer chain refers to low molecular weight compounds or polymer chain units having molecular weights less than about 550. They are made by reacting one or more low molecular weight saturated or unsaturated diols (below about 250) with one or more dicarboxylic acids to form ester units represented by formula (b) above.

Included among the low molecular weight diols which react to form short-chain ester units are saturated and/or unsaturated aliphatic, cycloaliphatic, and aromatic dihydroxy compounds. Preferred are diols with 2–15 carbon atoms such as ethylene, propylene, tetramethylene, pentamethylene, 2,2-dimethyltrimethylene, hexamethylene and decamethylene glycols; dihydroxy cyclohexane; cyclohexane dimethanol; resorcinol; hydroquinone; 1,5-dihydroxy naphthalene; or mixtures of any one or more of these diols with unsaturated diols such as butene-diol, hexene-diol, etc. Especially preferred are saturated aliphatic diols, mixtures thereof or a mixture of a saturated diol(s) with an unsaturated diol(s), each diol containing 2–8 carbon atoms. Included among the bis-phenols which can be used are bis(p-hydroxy) diphenyl, bis(p-hydroxyphenyl)methane, and bis(p-hydroxyphenyl) propane. Equivalent ester forming derivatives of these diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol only and not to its derivatives.

Dicarboxylic acids which are reacted with the foregoing long-chain glycols and low molecular weight diols to produce the copolyesters of this invention are aliphatic, cycloaliphatic, or aromatic dicarboxylic acids of a low molecular weight, i.e., having a molecular weight of less than about 300. The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —$SO_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, oxalic acid, azelaic acid, diethylmalonic acid, allylmalonic acid, 4-cyclohexene-1,2-dicarboxylic acid, 2-ethylsuberic acid, tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylene bis(cyclohexane carboxylic acid), 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids which can be used include terephthalic, phthalic and isophtalic acids, bi-benzoic acid, substituted dicarboxy compounds with two benzene nuclei such as bis(p-carboxyphenyl) methane, oxybis(benzoic acid) ethylene-bis-(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1$–$C_{12}$ alkyl and ring substitution derivatives thereof, such as halo, alkoxy, and aryl derivatives. Hydroxyl acids such as p(-hydroxyethoxy) benzoic acid can also be used providing an aromatic dicarboxylic acid is also present.

Aromatic dicarboxylic acids are an especially preferred class for preparing the copolyetherester polymers of this invention. Among the aromatic acids, those with 8-16 carbon atoms are preferred, particularly the phenylene dicarboxylic acids, i.e., phthalic, terephthalic and isophthalic acids and their dimethyl derivatives.

It is preferred that at least about 30% of the short segments are identical and that the identical segments form a homopolymer in the fiber forming molecular weight range (molecular weight 5000) having a melting point of at least 150° C. and preferably greater than 200° C. Copolyetheresters meeting these requirements exhibit a useful level of properties such as tensile strength and tear strength. Polymer melting points are conveniently determined by a differential scanning calorimeter.

The short-chain ester units will constitute about 15-95 weight percent of the copolyetherester. The remainder of the copolyetherester will be the long segments, ergo the long segment will comprise about 5-85 weight percent of the copolyetherester. Copolyetheresters in which the short-chain units comprise 25-90 weight percent with 10-75 weight percent long-chain units are preferred.

Preferred copolyetheresters are those prepared from dimethyl terephthalate, 1,4 butanediol, and poly(tetramethylene oxide) glycol having a molecular weight of about 600 to about 2000 or poly(ethylene oxide) glycol having a molecular weight of about 600–1500. Optionally up to about 30 mole percent, preferably 5–20 mole percent of the dimethyl terephthalate in these polymers can be replaced by dimethylphthalate or dimethyl isophthalate. Other preferred copolyetheresters are those prepared from dimethyl terephthalate, poly(tetramethylene oxide) glycol having a molecular weight of about 600 to about 2000, and a mixture of 1,4 butanediol with up to 50 mole percent, preferably from about 10 to about 40 mole percent of 1,6 hexanediol or 1,4 butenediol. The polymers based on poly(tetramethylene oxide) glycol are especially preferred because they are easily prepared, have overall superior physical properties, and are especially resistant to water.

Although the copolyesters of this invention possess many desirable properties, it is sometimes advisable to stabilize certain of the compositions to heat or radiation by ultraviolet light. This can be done by incorporating stabilizers in the polyester compositions. Satisfactory stabilizers comprise phenols and their derivatives, amines and their derivatives, compounds containing both hydroxyl and amine groups, hydroxyazines, oximes, polymeric phenolic esters and salts of multivalent metals in which the metal is in its lower state.

Representative phenol derivatives useful as stabilizers include 3,5-di-tert-butyl-4-hydroxy hydrocinnamic triester with 1,3,5-tris-(2-hydroxyethyl-s-triazinen-2,4,6-(1H, 3H, 5H) trione, 4,4'-bis(2,6-ditertiary-butylphenyl), 1,3,5-trimethyl-2,4,6-tris (3,5-ditertiary-butyl-4-hydroxylbenzyl)benzene and 4,4'-butylidene-bis(6-tertiary-butyl-m-cresol). Various inorganic metal salts or hydroxides can be used as well as organic complexes such as nickel dibutyl dithiocarbamate, manganous salicylate and copper 3-phenyl-salicylate. Typically amine stabilizers include N,N'-bis (betanaphthyl)-p-phenylenediamine, N,N'-bis(1-methylheptyl)-p-phenylene diamine and either phenyl-beta-napthyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones and/or benzotriazoles.

The properties of these copolyesters can be modified by incorporation of various conventional inorganic fillers such as carbon black, mica, talc, silica gel, alumina, clays and chopped fiberglass. These may be incorporated in amounts up to 50% by weight, preferably up to about 25% by weight. In general, these additives have the effect of increasing the modulus of the material at various elongations. Thus, low modulus filled or reinforced copolyethers are characterized as having a flexural modulus of less than about 400,000 psi, preferably less than 300,000 psi.

The low modulus copolyetherester polymer composition may also contain, with or without the reinforcing agents or fillers, one or more high molecular weight thermoplastic polymers. Suitable high molecular weight thermoplastic polymers include polyesters, polycarbonates, polyolefins, styrene resins and copolymers of these and the like. Preferred are blends with polyesters and aromatic polycarbonates. Especially preferred are the poly(alkylene terephthalate) polyesters, particularly poly(ethylene terephthalate) and poly(butylene terephthalate). These blends are known in the art and are generally described in U.S. Pat. Nos. 3,718,175; 3,907,926; 3,963,802; 4,124,653; 4,140,670; 4,157,325 and 4,184,997 and UK Pat. No. 1,431,916, among others, all incorporated herein by reference. Low modulus copolyetherester compositions consisting of unfilled or unreinforced blends of copolyetherester and a high molecular weight thermoplastic will generally have a flexural modulus of less than about 100,000 psi, preferably less than about 60,000 psi. However, filled and reinforced versions will generally, as noted above, have flexural modulus of less than about 400,000 psi, preferably less than about 300,000 psi.

Briefly, polyesters suitable for use in the copolyetherester polyesters blends of the present invention are derived from one or more aliphatic and/or cycloaliphatic glycols and one or more aromatic dicarboxylic acids. The glycol may be selected from the group consisting essentially of ethylene glycol; 2 methyl-1,3 propanediol; 1,4-butanediol; 1,5-pentanediol; 1,6-hexanediol and 1,4-cyclohexanedimethanol, and the like. Suitable dicarboxylic acids include terephthalic acid, phthalic acid, isophthalic acid and naphthalene 2,6-dicarboxylic acid. The polyesters of the present invention may also contain minor amounts of other units such as aliphatic dicarboxylic acids and/or aliphatic polyols to form copolyesters.

Generally, the polyesters of the present invention may be represented by the formula

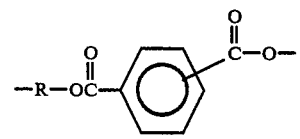

wherein R represents the divalent radical remaining after removal of the hydroxy groups from the glycol. Preferred polyesters include poly(ethylene terephthalate), poly(butylene terephthalate) and blends thereof.

The polyesters described herein are either commercially available or can be produced by methods well known in the art, such as those set forth in 2,465,319; 3,047,539 and 2,910,466, herein incorporated by reference. Further, the polyesters used herein have an intrinsic viscosity of from about 0.4 to about 2.0 dl/g as measured in 60:40 phenol/tetrachloroethane mixture or a similar solvent at 30° C.

Similarly, any of the polycarbonates known in the art may be blended with the copolyetherester for use in the present invention. Especially preferred polycarbonates are the aromatic polycarbonates. Aromatic polycarbonates useful herein are homopolymers, copolymers and mixtures thereof, which have an intrinsic viscosity of from about 0.3 to about 1.0 dl/g as measured in methylene chloride at 25° C.

Generally, the aromatic polycarbonates are prepared by reacting a dihydric phenol with a carbonate precursor such as phosgene, a haloformate or a carbonate ester. Typical of the dihydric phenols that may be employed are 2,2-bis(4-hydroxyphenyl)propane; bis(4-hydroxyphenyl)methane; 2,2-bis(4-hydroxy-3-methylphenyl)propane; (3,3'-dichloro-4,4'-dihydroxy diphenyl)methane and the like. The aromatic polycarbonates may be formed in accordance with the methods set forth in U.S. Pat. Nos. 2,999,835; 3,028,365; 2,999,844; 4,018,750 and 4,123,435, all incorporated herein by reference, as well as other processes known to those skilled in the art.

The polycarbonates so produced are typified as possessing recurring structural units of the formula

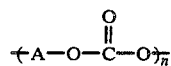

wherein A is a divalent aromatic radical of the dihydric phenol employed in the polymer producing reaction and n is greater than 1, preferably from about 10 to about 400.

It is of course possible to employ two or more different dihydric phenols or a dihydric phenol in combination with a glycol, a hydroxy or acid terminated polyester, or a dibasic acid in the event a carbonate copolymer or copolyester carbonate rather than a homopolymer polycarbonate is desired for use in the practice of the invention. Thus, it should be understood that the term "polycarbonate resin" embraces within its scope carbonate co-polymers.

Suitable copolymers also include those polycarbonate copolymers which comprise units derived from a first dihydric phenol which is a bis(hydroxyaryl)sulfone and a second dihydric phenol such as 2,2-bis(4-hydroxyphenyl)propane as disclosed in U.S. Pat. Nos. 3,737,409; and 2,999,846.

Suitable styrene resins include homopolymers, copolymers and graft copolymers thereof. Especially preferred styrene resins include homopolymer polystyrene, ABS type graft copolymers, and core-shell type graft copolymers as disclosed in U.S. Pat. Nos. 4,180,494; 3,808,180; 4,096,202; 4,260,693 and 4,292,233. Also preferred are rubber modified polystyrene such as a butadiene rubber modified polystyrene also referred to as high impact polystyrene or HIPS; styrene-butadiene-styrene block copolymer such as the Kraton or Kraton-G polymers that are described in U.S. Pat. Nos. 3,646,162 and 3,595,942; the modified alpha and para substituted styrenes or any of the styrene resins disclosed in U.S. Pat. No. 3,383,435, all of the aforementioned patents herein incorporated by reference.

Suitable olefin polymers and copolymers include polyethylene, polypropylene and ethylene-vinyl acetate copolymers and ethylene ethylacrylate copolymers, respectively. Such polyolefins are well known in the art.

Finally, it is also possible to use blends of the foregoing high-molecular weight thermoplastics in the compositions of the present invention. For example, one may use a combination of polycarbonate and a styrene resin, e.g. ABS or a core-shell graft copolymer. Other suitable combinations will be obvious to one skilled in the art.

It has now been found that the foregoing filled or unfilled, reinforced or unreinforced copolyetherester polymer and copolyetherester blend compositions may be foamed by use of suitable blowing agents, with or without nucleating agents, to produce low modulus engineering thermoplastic structural foams having very uniform cell structure good surface characteristics and high falling weight impact strength.

Specifically, it has been found that only a select few of the many known blowing agents and classes of blowing agents are suitable for the purpose of foaming low-modulus thermoplastic materials. More specifically, azodicarbonamide and modified azodicarbonamides, p-toluene sulfonyl semicarbazide, citric acid, sodium bicarbonate, citric acid/sodium bicarbonate concentrate and aliphatic azo esters, all having activation or decomposition temperatures within the range of from about 160° C. to 250° C., preferably from about 185° C. to about 215° C., may be used with or without nucleating or activating agents to foam low-modulus thermoplastics.

Azocarbonamide and modified azocarbonamides are well known and widely available commercially. Commerical grades and sources for these blowing agents include Celogen AZ series from Uniroyal Chemicals, Ficel series from BFC Chemicals, Nitropore and Kempore MC series from Olin Chemical, Chemocal series from Clark Cooper Corporation, Azocel from Fairmont Chemical Company and Vinyfor series from A&S Corporation.

The thermal decomposition range for the azodicarbonamide is from about 195° C. to about 215° C. Modified versions have a broader decomposition range, generally from about 160° C., and below, to 230° C., depending upon the modification. Most often, a modified azodicarbonamide is one which employes an additive as protective agents or activator and the like. Primarily, these adjuncts lower the decomposition temperature and increase the decomposition rate of the azodicarbonamide. Exemplary of the modifying additives include vinyl stabilizers containing basic salts of lead, cadmium or zinc; polyols, e.g., glycols and glycerol; and certain dibasic acids, e.g., oxalic and p-tolunesulfonic acids.

The thermal decomposition products of the azodicarbonamides generally comprise about 32% by wt of gaseous products and about 68% by wt of residue. The gaseous products primarily consist of nitrogen, carbon monoxide and carbon dioxide with minor amounts of ammonia, depending upon the particular source and grade of azodicarbonamide used, and the solid products consist essentially of urazol, biurea, cyamelide and cyanuric acid.

Sulfonyl semicarbazides are another class of suitable blowing agents. Especially, preferred is p-toluene sulfonyl semicarbazide. This is a known blowing agent and is available from commercial sources including Uniroyal Chemicals under the tradename Celogen RA. P-toluene sulfonyl carbazide has a decomposition temperature range of from about 228° C.-235° C., however, this can be lowered by the use of certain activators including lead stearate and BIK, barium stearate, zinc oxide and the like. Gaseous decomposition products are essentially the same as for the azodicarbonamides; however, the solid decomposition products consist essentially of ditolyl disulfide and ammonium p-toluene sulfonate.

Aliphatic azoesters are another class of satisfactory blowing agents. The decomposition temperature range for these is very broad, generally from about 180° C. to about 270° C. A most preferred azoester is 2,2-azobis-(2-acetoxy propane). This is available from several sources including Pennwalt Corporation under the tradename Luazo-AP. These are somewhat preferable to either of the aforementioned classes of blowing agents because the gaseous decomposition product is essentially 100% nitrogen. Thus, there is no ammonia gas generated which is believed to cause discoloration and to attack the thermoplastic material.

The most preferred blowing agents, however, are citric acid, sodium bicarbonate and citric acid/sodium bicarbonate concentrate blowing agents. These also are known blowing agents and are available from many commercial sources including C. H. Boehringer Sohn under the tradename Hydrocerol. Especially preferred are the Hydrocerol-A (hydrophobized anhydrous citric acid), Hydrocerol-HT (sodium bicarbonate) and Hydrocerol Compound (citric acid/sodium bicarbonate). Their decomposition temperature range is generally from about 150° C. to about 210° C., and the sole gaseous decompostion product is carbon dioxide. These are preferred because neither the gaseous nor the solid decomposition products have deleterious effects on the thermoplastic copolyetherester. Furthermore, unlike the above-mentioned blowing agents, these blowing agents do not need the presence of nucleating agents or activators in order to achieve uniformity of cells, although it is preferred. Additionally, these blowing agents produced foams having the most uniform, fine cellular structure.

The foaming agent can be added as a solid powder, as a dispersion in an inert liquid or with a diluent such as silica or a neutral clay or as a concentrate wherein a high concentration of the foaming agent is carried in a carrier polymer such as, for example, polyethylene. The particle size of the foaming agent is usually sufficiently small to facilitate uniform blending with the low modulus thermoplastic polymer and is generally less than about 50 microns. However, since many commercial foaming agents are available in aggregate form, the particular size of the aggregate will be somewhat larger.

The amount of blowing agent dispersed in the low-modulus thermoplastic is that amount which is sufficient to provide a uniform, essentially closed cell foam manifesting the desired weight reduction and other physical properties. The density of the foam is preferably in the range of about 0.4 to 1.2 g/cc, more preferably from about 0.7 to 1.0 g/cc.

The amount of blowing agent used for the desired foam density will depend on the particular blowing agent selected, on the amount of gas generated by it upon decomposition and will depend on the particular melt blending and extrusion process selected because the efficiency of the blowing agent can be affected by the tendency of a particular melt extruder to allow gaseous products to escape from the extruder. In general, the amount will range from about 0.05 to about 1.5% by wt. based on the polymer, preferably from about 0.1 to about 0.8% by weight, based on the polymer, to provide a sufficient degree of foaming without yielding an undesirably low density or open pore structure.

Further, as noted above, the copolyetherester compositions may contain fillers and or reinforcing agents which tend to increase flexural modulus. However, many of these adjuncts, particularly carbon powder, glass, mica, talc, clay, fumed silica and the like are useful in the present invention as activators or nucleating agents for the foaming action. Their presence helps to produce a more uniform foam and is preferred. This benefit is achieved even at low levels of in corporation, i.e., even less than that amount needed in order to achieve reinforcement as with for example glass.

The copolyetherester foams of the present invention may also be rendered flame retardant by use of suitable flame retardant agents. The flame retardant may be premixed with the low-modulus thermoplastic copolyetheresters or blends thereof, or added during processing of the foam itself. Suitable flame retardant agents are as disclosed in U.S. Pat. Nos. 3,751,400; 3,855,277 and 3,975,905. Especially preferred are the polymeric and oligomeric flame retardant agents comprising tetrabromobisphenol-A carbonate units, see for example U.S. Pat. No. 3,833,685. All of the aforementioned patents are incorporated herein by reference. Other preferred flame retardant agents are known in the art and include brominated epoxy compounds. It is also contemplated that the foregoing flame retardants may be used in combination with synergists including for example antimony compounds.

Generally, the structural foams of the present invention may be prepared by any of the known methods in the art. For example, the foams may be prepared by dry mixing the blowing agent and polymer composition, and thereafter melt blending the composition in an extruder. The foams may be injection molded, extruded and the like to produced finished articles or stock materials.

DETAILED DESCRIPTION OF THE PREFERRED EMBODIMENTS

The following examples are given by way of illustration of the invention and are not to be construed as a limitation thereof. Unless otherwise indicated, all formulation amounts are presented in parts by weight.

EXAMPLES 1-3

Low-modulus engineering thermoplastic strutural foams embodying the present invention were prepared from Hytrel 4275 (E.I duPont) a copolyetherester based on butanediol, dimethyl terephthalate and poly(tetramethylene oxide) glycol; Gaflex 555 (GAF Corporation) a copolyetherester based on butane diol, butene diol, dimethyl terephthalate and poly(tetramethylene oxide) glycol; and BESNO-P40 (Rilsan Corporation) a low-modulus Nylon 11.

Each was foamed using Celogen AZ130 azodicarbonamide blowing agent along with stabilizer and clay. The exact compositions and the physical properties of the resultant foams were as set forth in Table 1.

TABLE 1

|  | Examples | | |
| --- | --- | --- | --- |
|  | 1 | 2 | 3 |
| Stabilizer | 1.0 | 1.0 | 1.0 |
| Clay | 25.0 | 25.0 | 25.0 |
| Hytrel 4275 | 74.0 | — | — |
| Gaflex 555 | — | 74.0 | — |
| Nylon 11 (BESNO P-40) | — | — | 74.0 |
| Celogen AZ130 | 0.5 | 0.5 | 0.5 |
| Properties At 20% Wt. Reduction | | | |
| Notched Izod, ft. lbs./in. | 2.2 | 2.2 | 1.6 |
| Unnotched Izod, ft. lbs./in. | NB* | NB* | NB* |
| Flexural Strength, psi | 2,700 | 2,776 | 4,625 |
| Flexural Modulus, psi | 32,180 | 34,100 | 69,300 |
| Falling Wt. Impact, ft. lb. @RT | 18 | 24 | 39 |

*None of the tested parts broke.

The foams resulting from examples 1-3 all had uniform cellular structure, good surface appearance and good impact strength, including room temperature falling weight impact strength. While the nylon foam had higher falling weight impact and flexural strengths, it also had more than double the flexural modulus of the copolyetherester foams as well as lower notched izod impact strength. Thus, low modulus copolyetherester foams were prepared having good overall physical strength and properties while retaining low modulus.

EXAMPLES 4-7

A similar set of examples was prepared using GAFLEX 555 copolyetherester, BESNO P40 and Nylon 11, however, Hydrocerol Compound (citric acid/sodium bicarbonate concentrate) was used as the blowing agent. The formulation and physical properties of these foams were as set forth in Table 2.

TABLE 2

|  | Examples | | | |
| --- | --- | --- | --- | --- |
|  | 4 | 5 | 6 | 7 |
| Stabilizer | 1.0 | 1.0 | 1.0 | 1.0 |
| Clay | — | — | 25 | 25 |
| Gaflex 555 | 99 | 66 | 74 | — |
| Nylon 11 | — | — | — | 74 |
| Poly(butylene terepthalate)$^a$ | — | 33 | — | — |
| Hydrocerol Compound | 0.5 | 0.5 | 0.5 | 0.5 |
| Properties At 20% Weight Reduction | | | | |
| Falling Weight Impact ft., lb. | | | | |
| @RT | 70 | 55 | 70 | 50 |
| @-30° C | 50 | 15 | 30 | 5 |

$^a$General Electric Company-Valox ® 295 resin.

The low-modulus structural foams prepared with sodium bicarbonate/citric acid concentrate as blowing agent (Examples 4-7) have excellent surface appearance and a very fine uniform microcellular structure. More importantly, these foams have an unexpectedly high falling weight impact strength at −30° C. as well as at room temperature. Additionally, examples 4 and 5 demonstrate the ability of these blowing agents to perform excellently even without the addition of nucleating agents.

A comparision of the falling weight impact strength of examples 2 and 3 with examples 6 and 7 demonstrates the significant and totally unexpected improvement thereof in low-modulus foams prepared with blowing agents based on sodium bicarbonate, citric acid and combination thereof. Further, it is evident that this improvement is even greater in the case of copolyetherester resins. Thus, these blowing agents are preferred.

Finally, forms prepared with these foaming agents had a superior unifomity and excellent microcellular structure than those prepared with the azodicarbonmide foaming agents above.

EXAMPLES 8-11

A third set of examples was prepared using GAFLEX 547 and GAFLEX 555 copolyetheresters, with or without poly(butylene terephthalate). Hydrocerol A (citric acid) was used as the blowing agent. The formulations and resultan physical properties of these foams were as set forth in Table 3.

TABLE 3

|  | 8 | 9 | 10 | 11 |
| --- | --- | --- | --- | --- |
| Stabilizer | 1.0 | 1.0 | 1.0 | 1.0 |
| GAFLEX 547 | 99 | — | — | — |
| GAFLEX 555 | — | 99 | 80 | 66 |
| Poly(butylene terephthalate)$^a$ | — | — | 19 | 33 |
| Hydrocerol A | 0.5 | 0.5 | 0.5 | 0.5 |
| Properties at 20% Wt. Reduction | | | | |
| Density g/cc | 0.95 | 0.97 | 0.98 | 0.99 |
| Wall thickness, in. | 0.25 | 0.25 | 0.25 | 0.25 |
| Tensile Strength, psi | 1700 | 1800 | 2100 | 2700 |
| Elongation, % | 347 | 38 | 25 | 18 |
| Tensile Modulus, psi | 10100 | 13900 | 24300 | 41000 |
| Flexural Strength, psi | 700 | 1100 | 2000 | 2900 |
| Flexural Modulus, psi | 14000 | 20500 | 50200 | 85000 |
| Unnotched Izod Impact Strength* ft. lbs/in. | NB** | NB | NB | NB |

*Used 5 and 10 pound hammers.
**None of the parts tested broke (NB).
$^a$General Electric Company-Valox ® 295 resin.

Examples 8 through 11 further demonstrate the scope of the present invention. These examples once again demonstrate the ability to forego the use of nucleating agents when using the preferred blowing agents, i.e., those based on sodium bicarbonate and/or citric acid. These examples also show the retention of good overall physical properties in foamed versions of copolyetheresters and blends thereof with poly(butylene terephthalate).

Obviously, other modifications and variations of the present invention are possible in light of the above teachings. It is therefore, to be understood that changes may be made in the particular embodiments of the invention described which are within the full intended scope of the invention as defined by the appended claims.

I claim:

1. A formable low-modulus thermoplastic composition which comprises:
   (a) a low-modulus poletherester copolymer wherein the ether linkage are present as high molecular weight polyalkylene ether units derived from long chaim polyalkylene ether glycols, and
   (b) an effective amount of a chemical blowing agent selected from the group consisting of citric acid, and a mixture of citric acid and sodium bicarbonate, sufficient to achieved the desired weight reduction in the resultant foamed composition.

2. The composition of claim 1 wherein the chemical blowing agent is citric acid.

3. The composition of claim 1 wherein the chemical blowing agent is a mixture of citric acid and soduim bicarbonate.

4. The composition of claim 1 wherein the low-modulus thermoplastic polymer is a polyetherester copolymer consisting essentially of a multiplicity of recurring intralinear long-chain and short-chain ester units connected head-to-tail through ester linkages, said long-chain ester units being represented by the following structure:

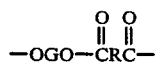

and said short-chain ester units being represented by the following structure:

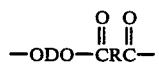

wherein G is a divalent radical remaining after removal of terminal hydroxy groups from poly(alkylene oxide) glycols having a carbon-to-oxygen ratio of about 2.0–4.3 and a molecular weig.ht between about 400 and 6000; R is a divalent radical remaining after removal of carboxyl groups from one or more dicarboxylic acids having a molecular weight less than about 300; and D is a divalent radical remaining after removal of hydroxyl groups from one or more saturated and/or unsaturated, low molecular weight diols having a molecular weight less than about 250 with the provisions that the short-chain ester units constitute about 15–95% by weight, preferably 25–90% by weight, of the copolyetherester and, ergo, the long-chain ester units constitute about 5–85% by weight, preferably 10–75% by weight of the copolyetherester.

5. The composition of claim 4 wherein the copolyetherester is derived from butanediol, poly(tetramethylene oxide) glycol and dimethyl terephthalate.

6. The composition of claim 4 wherein the copolyetherester is derived from butanediol, hexanediol, poly(tetramethylene oxide) glycol and dimethyl terephthalate.

7. The composition of claim 4 wherein the copolyetherester is derived from butanediol, butene-diol, poly(tetramethylene oxide) glycol and dimethyl terephthalate.

8. The foamable composition of claim 1 wherein the amount of blowing agent used is from about 0.01 to about 1.5 parts by weight per 100 parts by weight of polymer.

9. The foamable composition of claim 1 wherein the amount of blowing agent used is from about 0.1 to about 0.8 parts by weight per 100 parts by weight polymer.

10. The foamable low-modulus thermoplastic composition of claim 1 which further comprises one or more high-molecular weight thermoplastic polymers selected from the group consisting essentially of polyesters, polycarbonates, polyolefins, styrenic resins and copolymers thereof.

11. The composition of claim 10 wherein the high-molecular weight thermoplastic polymer is a polyester represented by the formula

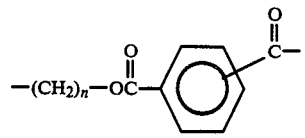

wherein n is an integer of from about 2 to about 10.

12. The composition of claim 11 wherein the polyester is poly(butylene terephthalate).

13. The composition of claim 1 which further comprises a nucleating amount of a filler or reinforcing agent selected from the group consisting essentially of mica, clay, glass, talc, foamed silica and mixtures thereof.

14. The composition of claim 13 wherein the filler and/or reinforcing agents are present in an amount up to about 50% by weight based on the total composition.

15. The composition of claim 1 which further comprises a flame retarding amount of a flame retardant.

* * * * *